(Model.)

J. B. JONIS.
TOGGLE FOR BOOM CHAINS.

No. 286,544. Patented Oct. 9, 1883.

WITNESSES:
C. Neveux
C. Sedgwick

INVENTOR:
J. B. Jonis
BY
ATTORNEYS.

UNITED STATES PATENT OFFICE.

JOHN B. JONIS, OF OLYMPIA, WASHINGTON TERRITORY.

TOGGLE FOR BOOM-CHAINS.

SPECIFICATION forming part of Letters Patent No. 286,544, dated October 9, 1883.

Application filed March 14, 1883. (Model.)

*To all whom it may concern:*

Be it known that I, JOHN B. JONIS, of Olympia, in the county of Thurston, Washington Territory, have invented a new and useful Improvement in Toggles for Boom-Chains, of which the following is a full, clear, and exact description.

In booms used by lumbermen to confine logs and timber of any kind in the water, either at the mill or at the logging-camp where the logs are put in the water, or for towing the logs or sticks from one place to another, said logs or sticks of timber are connected or fastened together at their ends by chains provided with toggles. Heretofore, owing to the defective construction of the toggles and manner of applying them, they and their chains were very liable to become unhitched by the action of the water on the boom-sticks, or by said sticks turning over, and not unfrequently the ends of the sticks were split by the strain thrown upon them.

Reference is to be had to the accompanying drawings, forming part of this specification, in which similar letters of reference indicate corresponding parts in both figures.

Figure 1:
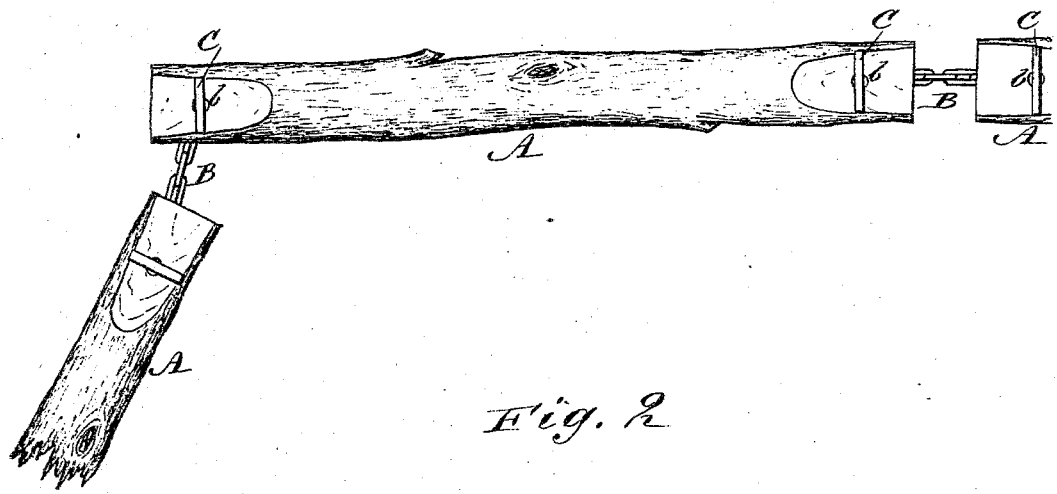
Figure 2:
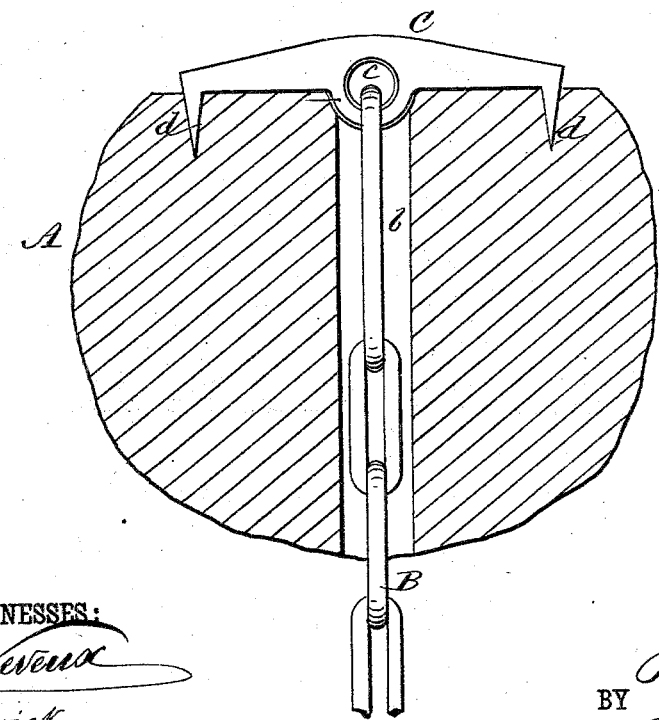

Figure 1 represents a plan of a boom in part, with my improved toggles and their chains applied to the sticks; and Fig. 2 is a transverse section, upon a larger scale, through one of the boom-sticks, with one of my improved toggles and attached chain applied.

A A indicate the boom-sticks, having holes $b\ b$ through them, near their ends, for passage of the connecting-chains B B through them. C C are the toggles, attached to the ends of said boom-chains, for securing the chains to the sticks. Each of these toggles C has a hole, $c$, in its body, for linking the end of the chain to it, and has its ends $d\ d$ bent at right angles, or nearly so, to its body, for entry by driving on the toggle within the stick or log on opposite sides of the hole $b$, through which its chain B passes. These bent toggle ends $d\ d$ may either be sharp on their outer ends, as shown in the drawings, or they may be burred or roughened by a chisel, or otherwise, to insure them sticking to their places. By means of these toggles C, constructed and applied as described, all the advantages, as hereinbefore specified, sought to be obtained are secured.

I am aware that a boom-chain toggle has been formed of a pin having end bent points and supporting the chain-link on its top; but

What I claim as new and of my invention is—

A boom-chain toggle formed of a metallic bar having a median eye, $c$, projecting down from its under side and fitting into the boom-stick hole $b$, as well as provided with right-angled end points, $d\ d$, as shown and described.

JOHN B. JONIS.

Witnesses:
NATHAN S. PORTER,
HENRY SABIN.